United States Patent
Hartman et al.

(10) Patent No.: US 9,949,347 B2
(45) Date of Patent: Apr. 17, 2018

(54) SYSTEM AND PROCESSES FOR COMMISSIONING INDOOR INDUSTRIAL LIGHTING

(71) Applicant: GENERAL ELECTRIC COMPANY, Schenectady, NY (US)

(72) Inventors: Michael James Hartman, Clifton Park, NY (US); John Erik Hershey, Ballston Lake, NY (US); Danijel Maricic, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 74 days.

(21) Appl. No.: 14/865,350

(22) Filed: Sep. 25, 2015

(65) Prior Publication Data
US 2017/0094754 A1   Mar. 30, 2017

(51) Int. Cl.
*H05B 37/02* (2006.01)
*H05B 33/08* (2006.01)
*G08C 17/02* (2006.01)

(52) U.S. Cl.
CPC ......... *H05B 37/0272* (2013.01); *G08C 17/02* (2013.01); *H05B 33/0842* (2013.01); *H05B 37/0227* (2013.01); *H05B 37/0263* (2013.01)

(58) Field of Classification Search
None
See application file for complete search history.

(56) References Cited

U.S. PATENT DOCUMENTS

| | | |
|---|---|---|
| 6,583,573 B2 | 6/2003 | Bierman |
| 7,307,542 B1 | 12/2007 | Chandler et al. |

(Continued)

FOREIGN PATENT DOCUMENTS

WO   2012131631 A1   10/2012

OTHER PUBLICATIONS

U.S. Final Office Action issued in connection with related U.S. Appl. No. 14/866,825 dated Jan. 12, 2017.

(Continued)

*Primary Examiner* — Dedei K Hammond
(74) *Attorney, Agent, or Firm* — Pabitra K. Chakrabarti

(57) ABSTRACT

Processes for commissioning an indoor lighting system composed of a plurality of lighting fixtures, each including a lighting associate, include the steps of establishing a direct connection table for each lighting associate; forming a full direct connection table represented as a square matrix and comprising data derived from all direct connection tables; grouping the lighting associates using an element reduction operation on the square matrix; and transmitting a group direct connection matrix to each lighting associate. The lighting fixtures may include a first transmitter for transmitting a first message to a second lighting associate; a first receiver for receiving a second message from the second lighting associate; a second transmitter for transmitting a third message via a lighting associate support network; a second receiver for receiving a fourth message via the lighting associate support network; an interval timer; a microcontroller in communication with the interval timer, programmable to execute a networking and communication algorithm to process the first, second, third, and fourth messages; an LED lamp; and a switch between the lamp and a power line, controllable by the microcontroller.

14 Claims, 5 Drawing Sheets

(56) References Cited

U.S. PATENT DOCUMENTS

| | | | |
|---|---|---|---|
| 8,373,362 B2 | 2/2013 | Chemel et al. | |
| 8,729,835 B2 | 5/2014 | Henig et al. | |
| 8,749,146 B2 | 6/2014 | Jones | |
| 2002/0047631 A1* | 4/2002 | Pederson | H05B 33/0851 315/291 |
| 2002/0067144 A1* | 6/2002 | Hoffknecht | H05B 39/085 315/291 |
| 2003/0222603 A1* | 12/2003 | Mogilner | H05B 37/0263 315/294 |
| 2009/0026966 A1* | 1/2009 | Budde | H05B 37/02 315/152 |
| 2013/0183042 A1 | 7/2013 | Knapp et al. | |
| 2014/0001963 A1 | 1/2014 | Chobot et al. | |
| 2014/0088772 A1 | 3/2014 | Lelkens | |
| 2014/0333206 A1 | 11/2014 | Simons et al. | |
| 2015/0372753 A1 | 12/2015 | Jovicic et al. | |
| 2016/0037293 A1 | 2/2016 | Jovicic et al. | |
| 2016/0088707 A1* | 3/2016 | Van De Sluis | H05B 37/0227 315/149 |
| 2016/0120007 A1* | 4/2016 | Rein | H05B 37/0227 315/158 |

OTHER PUBLICATIONS

Basu et al., "Sensor-Based Predictive Modeling for Smart Lighting in Grid-Integrated Buildings", Sensors Journal, IEEE, pp. 4216-4229, vol. 14, Issue: 12, Dec. 2014.

"Introduction to the Commissioning Process", Lighting Controls Association, http://lightingcontrolsassociation.org/introduction-to-the-commissioning-process/, 11 Pages, Dec. 17, 2012.

Massa, Donald, "Choosing an Ultrasonic Sensor for Proximity or Distance Measurement. Part 1: Acoustic Considerations", Sensors, pp. 34-37, Feb. 1999.

U.S. Non-Final Office Action issued in connection with related U.S. Appl. No. 14/866825 dated Jul. 1, 2016.

* cited by examiner

| Sync word | Type | Identification number of the transmitting lighting associate | Identification number of the addressed lighting associate(s) | Number of symbols following this field | Data/ instructions | ECC |

SYSTEM AND PROCESSES FOR COMMISSIONING INDOOR INDUSTRIAL LIGHTING

BACKGROUND

The present invention relates to lighting systems, and to systems and techniques that can be employed in the commissioning of lighting systems.

Adoption of light emitting diodes (LED) for lighting has revolutionized indoor industrial lighting, providing multi-dimensional advantages to users. These advantages include lower energy requirements for novel lighting systems than formerly required for conventional lighting systems, better color selection and adaptation, and longer lifetimes of the irradiating luminaires. Additional benefits accruing to lighting systems are derived from the government's allocation of broad swathes of unlicensed and unzoned frequency spectrums. The availability of these broad swathes of frequency spectrums enables the coupling of wireless communications techniques with lighting technology. The coupling of these technologies continues to provide users with ever more useful and valuable synergies in lighting systems.

An important and persistent problem that exists within lighting systems is an awareness of the locations of the various lighting fixtures within a large industrial concern. For example, a multi-level office building can easily contain numerous lighting fixtures on each floor. The arrangement of the locations for the lighting fixtures can very often be different on each floor. It is generally desirable to be able to control these lighting fixtures remotely to accommodate the occupants that may have differing needs and desires within the multi-level office building. As the floor space in office buildings increases, the data regarding placement and connection of the lighting fixtures grows enormously and continues to scale upward as industrial spaces increase.

One particular issue that continues to require innovation is the commissioning of the lighting fixtures. The assignment and reassignment of lighting fixtures to different areas may also involve reassigning the controls associated with those lighting fixtures. The problem is often two-fold: first, installation crews may not be able to generate accurate positional logs for lighting fixture installations because indoor location systems may be error prone; and second, the interior space of a building can be altered through the installation, removal, or moving of interior non load-bearing space separators such as wallboard panels.

Consequently, traditional maintenance of the infrastructure records for lighting is difficult. Proper grouping of the lighting fixtures and their control may require a large manual effort as well as several iterations before meaningful and correct adjustments are made. There is therefore a need for systems and techniques that will efficiently automate the commissioning and control of lighting facilities in large, multi-partitioned spaces.

BRIEF DESCRIPTION

In one aspect, the present invention relates to processes for commissioning an indoor lighting system composed of a plurality of lighting fixtures, each including a lighting associate, include the steps of establishing a direct connection table for each lighting associate; forming a full direct connection table represented as a square matrix and comprising data derived from all direct connection tables; grouping the lighting associates using an element reduction operation on the square matrix; and transmitting a group direct connection matrix to each lighting associate.

In another aspect, the present invention relates to lighting fixtures that may be used in the commissioning processes. The lighting fixtures include a first transmitter for transmitting a first message to a second lighting associate; a first receiver for receiving a second message from the second lighting associate; a second transmitter for transmitting a third message via a lighting associate support network; a second receiver for receiving a fourth message via the lighting associate support network; an interval timer; a microcontroller in communication with the interval timer, programmable to execute a networking and communication algorithm to process the first, second, third, and fourth messages; an LED lamp; and a switch between the lamp and a power line, controllable by the microcontroller.

DRAWINGS

DETAILED DESCRIPTION

Efficient and effective commissioning of indoor industrial lighting is achievable by using lighting fixtures that use electronics, signal processing, and communications techniques that are especially fashioned to serve in overcoming the decidedly difficult problems associated with indoor lighting control. In particular, if messages may be communicated in more than one mode, such as by wireless and power line communications, there will likely be greater efficiency in communications than would obtain by relying just on a single mode of communication.

Figure 1:
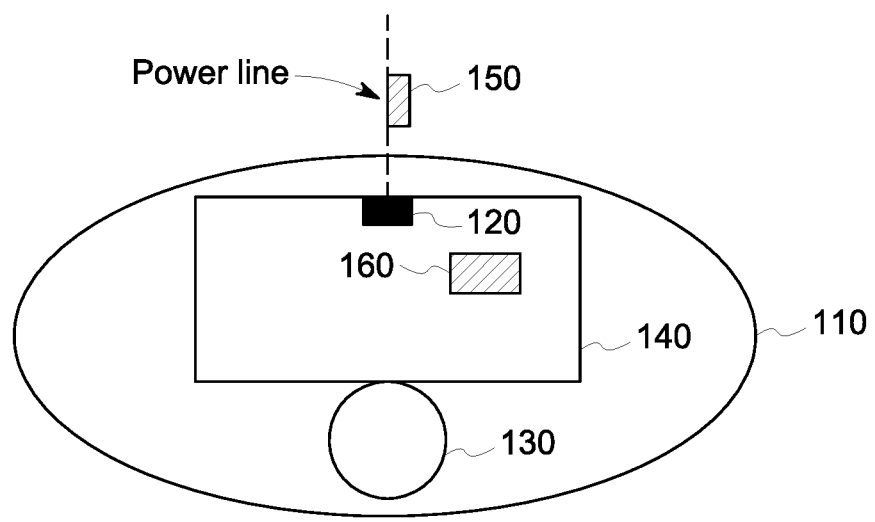
FIG. 1 illustrates a lighting associate according to the present invention.

The lighting fixture comprises an LED lamp and a lighting associate. As used herein the lighting associate comprises a switch, an interval timer, a transmitter and a receiver capable of transmitting and receiving messages via at least one of electromagnetic and acoustic propagation means, a transmitter and receiver for transmitting and receiving messages via a lighting associate support network, a microcontroller and memory programmed with a networking and communications algorithm that organizes one or more lighting associates for networking operations for component health assessment and controls, and associated electronics that may include a battery or a capacitor to enable a period of messaging should the power line become non-energized, a charging circuit for charging the battery or capacitor, a GPS receiver and an indoor location system, a camera, an accelerometer, an acoustic annunciator, a power line communications coupler, an acoustic power radiometer, an electromagnetic signal power radiometer, a fire detector, and a smoke detector. The antenna apertures of the lighting associate's wireless transmitter and receiver may allow for different gain patterns, such patterns to be modified manually or electronically or electromechanically. FIG. 1 illustrates a lighting fixture 110 according to the present invention, including an LED lamp 130 and the lighting associate 140. The lighting fixture 110 may be connected to a power line for its primary power source by a switch 150 and also coupled to the power line by a power line communications coupler 120 for communications using the power line as a communication channel. The lighting associate 140 includes an interval timer 160.

The lighting associate may communicate with a remote monitoring and control center. Different communication mechanisms may be employed in accordance with varying embodiments for lighting associates. In one embodiment a power line conducted (PLC) modem may be employed to provide a communications path for lighting associates across power lines that are operatively connected to the lighting associates and the remote monitoring and/or control center.

In other embodiments, an electromagnetic transmission path may be established between a lighting associate and a portal provided by a cellular phone service, WiFi, or other wireless communication facility. The portal may interface with the system to provide control over the groups within a building. The portal may also allow the groups to report to the system results of sensors contained within the lighting associates. The report to the system may contain security data such as motion detected or other security issues. The report may contain self-test or illumination data for one or more lamps within lighting associates.

In yet other embodiments, an acoustic transmission path may be established between the lighting associate and a handheld communicator such as a cellular phone. In one particular embodiment, acoustic transmission is effected in a frequency range that can be accommodated by the audio microphone contained within the handheld communicator.

Figures 2, 3:
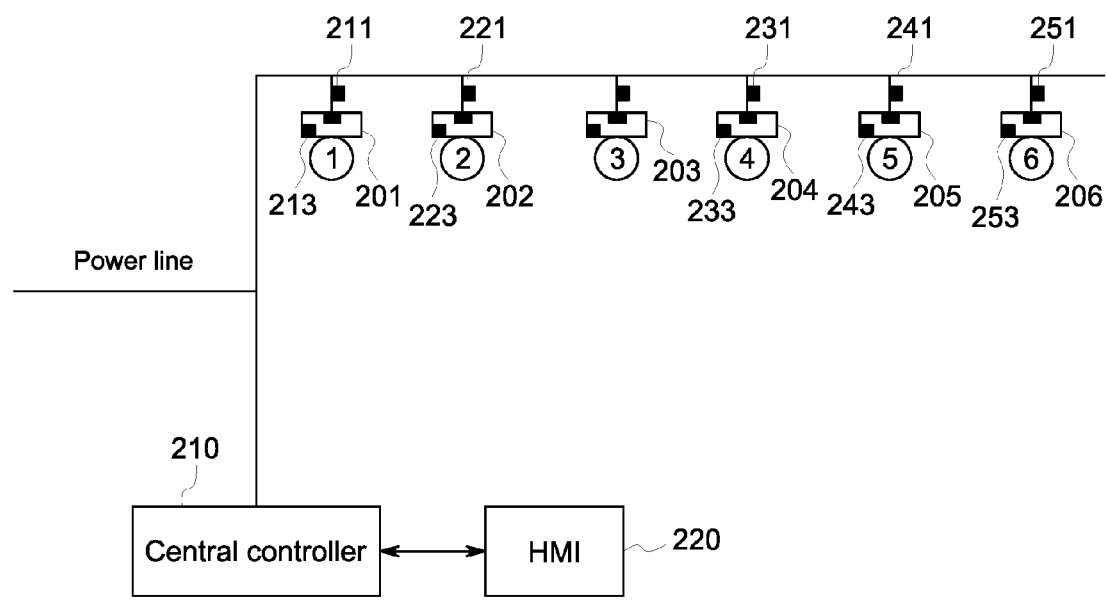
FIG. 2 illustrates a lighting system according to the present invention that includes a central controller connected to lighting associates and a human-machine-interface.
FIG. 3 illustrates a self-identification message.

FIG. 2 illustrates an exemplary lighting system according to the present invention that includes Central Controller 210 connected to lighting associates under its control. For this non-limiting example there are six lighting associates, 201, 202, 203, 204, 205, and 206, all connected to the Central Controller 210 through a power line. The Central Controller 210 transmits to and receives messages from the lighting associates. The Central Controller 210 also includes a human-machine-interface (HMI) 220 having controls operable by a human operator; and output devices suitable for informing or alerting the human operator to conditions requiring the human operator's attention (not shown). Each of lighting associates, 201, 202, 203, 204, 205, and 206 includes a first transmitter for transmitting a first message to a second lighting associate, a first receiver for receiving a second message from the second lighting associate, a second transmitter for transmitting a third message via a lighting associate support network, a second receiver for receiving a fourth message via the lighting associate support network, an interval timer (213, 223, 233, 243, and 253), a microcontroller in communication with the interval timer, programmable to execute a networking and communication algorithm to process the first, second, third, and fourth messages, and a switch (211, 221, 231, 241, and 251) between the lamp and a power line, controllable by the microcontroller.

Some of the lighting associates may be able to communicate with other lighting associates using only wireless electromagnetic or acoustic links for direct connection and relay depending upon their locations within the indoor facility and the characteristics of any intervening walls, partitions, and other line of sight obstructions. The mode of wireless communication used by the lighting associates is either acoustic or electromagnetic. In both of these modes, a modulation, such as spread spectrum signaling, may diminish the probability of a potential communication path between two nodes being non-reciprocal, meaning that the channel from a first lighting associate to a second lighting associate will not be the same as the channel from the second lighting associate to the first lighting associate. Because the transmitting and receiving antennas on a particular lighting associate may be realized by different apertures, and because the signaling wavelengths are expected to be very short, there is the possibility of a null in only one transmission direction due to the spatial separation between the apertures. This problem may be overcome by using a spread spectrum signaling ceteris paribus. A set of lighting associates that can communicate with each other using only wireless electromagnetic or acoustic links for direct connection and relay is termed a common area grouping.

The commissioning process is performed by a networking and communications algorithm executed by the Central Controller and the lighting associates that are connected to a common power line to discern the groups of the lighting associates. The Central Controller, by sending messages to the lighting associates via the common power line, may order the lighting associates to initiate the networking and communications algorithm.

The networking and communications algorithm includes the two phases of operation. The first phase allows discovery of an individual lighting associate's group, the set of the individual lighting associate's first connectivity neighbors, those lighting associates that are capable of direct wireless communication with the individual lighting associate, i.e., communication that does not need to be relayed through another lighting associate, and those lighting associates with which the individual lighting associate can communicate by using non direct communication, i.e., communication that requires wireless relay through one or more lighting associates. The second phase identifies the groups of lighting associates. An individual lighting associate's group may serve as a network for originating, or transporting, or delivering data messages between lighting associates in that individual lighting associate's group and a lighting associate support network such as the power line common to the Central Controller and the lighting associates. The communications protocol between lighting associates during the first phase of the networking and communications algorithm may be collision detection multiple access. The communications protocol between lighting associates during the second phase of the networking and communications algorithm may be time division multiple access.

The first phase of the networking and communications algorithm proceeds sequentially for each lighting associate. The lighting associate transmits a self-identification message that identifies the lighting associate by its unique pre-assigned identification number. FIG. 3 illustrates a self-identification message. The SYNC WORD is a data symbol sequence that serves as an alert signal to any listening lighting associate that a message transmission has been initiated by a lighting associate. The field immediately following the SYNC WORD is the TYPE field designating the phase of the networking and communications algorithm and the identification of the message as a self-identification message. For this message, the TYPE field designates that the networking and communications algorithm is in its first phase and that the transmitting lighting associate's identification number immediately follows. The self-identification messages used in the first phase of the networking and communication algorithm may be shorter than the messages sent during the second phase of the networking and communication algorithm. The transmission mode may be such that a lighting associate does not transmit if it senses the channel is in use. Once it senses a quiet channel it delays the beginning of its transmission by a random time interval in order to mitigate message collisions. Additionally, if a first transmitting lighting associate detects a second lighting associate transmission while it is transmitting, the first transmitting lighting associate may cease transmitting and again attempt its transmission after detection of a quiet channel and a random time interval. The transmission mode used by a transmitting lighting associate may be either acoustic or electromagnetic. In both of these modes, a modulation, such as spread spectrum signaling, is used in order to significantly diminish the probability of a potential communication path between two nodes being non-reciprocal, meaning that the channel from a first lighting associate to a second lighting associate may not be the same as the channel from the second lighting associate to the first lighting associate. Because the transmitting and receiving antennas on a particular lighting associate may be realized by different apertures, and because the signaling wavelengths are expected to be very short, there is the possibility of a null in only one transmission direction due to the spatial separation between the apertures. This problem may be overcome by using a spread spectrum signaling ceteris paribus.

Figures 4, 5:
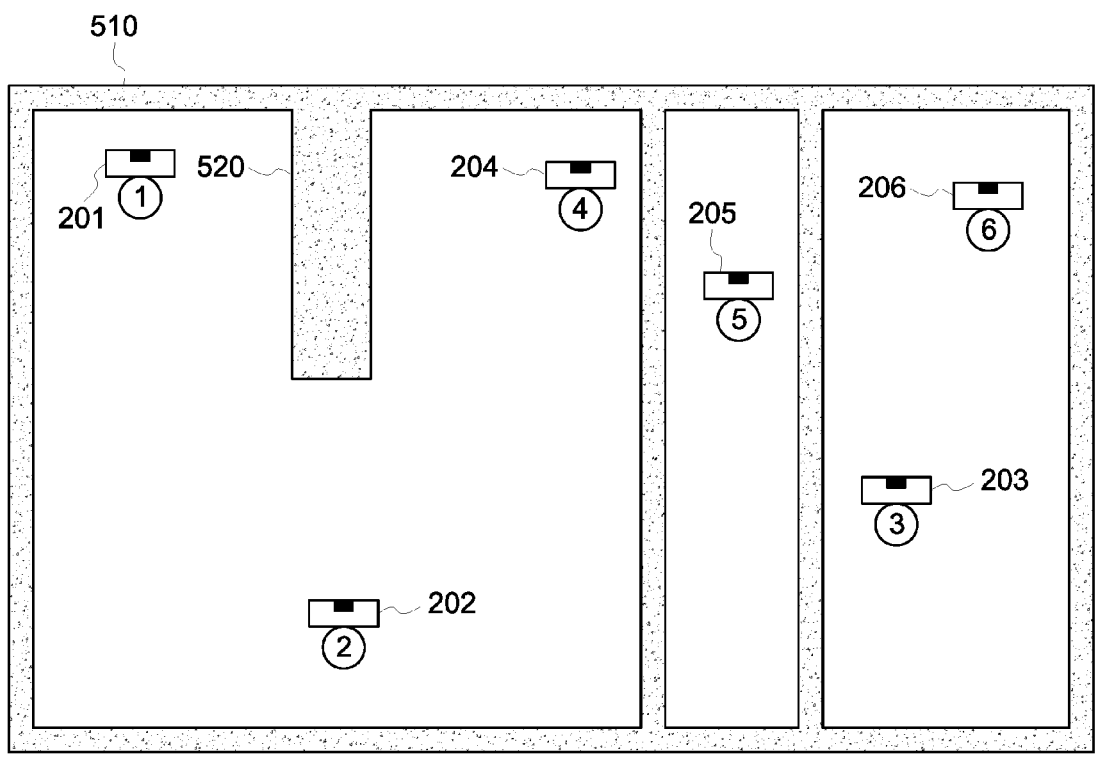
FIG. 4 illustrates an answer message.
FIG. 5 illustrates six lighting associates.

Lighting associates that successfully receive a self-identification message may respond with an answer message. FIG. 4 illustrates an exemplary answer message. The TYPE field designates that the networking and communications algorithm is in its first phase, followed by a field containing the identification number of the lighting associate that sent the self-identification message, followed by the answering lighting associate's identification number. An answering lighting associate's mode and modulation may be the same as the transmitting lighting associate that sent the self-identification message.

In some embodiments, electromagnetic radiation is used for the process of identifying group members. A lighting associate may be equipped with an electromagnetic transmitter/receiver configured to communicate using one or more electromagnetic frequency bands. In one particular embodiment, the frequency of the electromagnetic radiation employed by a lighting associate in ascertaining reliable communications may be within one of the ISM unlicensed bands. Examples of unlicensed bands are those around 2.4 GHz or 5.8 GHz.

Electromagnetic shielding occurs once transmitted electromagnetic radiation encounters an obstacle. It can occur in varying degrees depending upon the frequency of the signal and the substance making up the obstacle. Different substances have different effects on the electromagnetic radiation. Particular types of substances can substantially prevent transmission of electromagnetic signals from passing through the substance. Other types of substances have less effect on the electromagnetic radiation. Load bearing walls and non-load-bearing walls present different degrees of electromagnetic shielding. Load bearing walls are typically made out of denser materials and tend to substantially attenuate or block the electromagnetic radiation. The electromagnetic shielding property of non-load bearing walls varies with the composition of the non-load bearing wall. Drywall and glass provide little attenuation. Drywall that is one half inch thick is known to exhibit isolation of about 0.6 dB at a frequency of 2 GHz while virtually no attenuation at 5 GHz. Quarter inch glass provides about 1.4 dBs of isolation at 2 GHz and about 1 dB of isolation at 5 GHz. Wall composition estimation can be improved by comparing the propagation at various frequencies and power levels.

In another embodiment, the radiation employed in the process of identifying group members is acoustic. An example of one type of acoustic radiation that may be employed by embodiments is ultrasonic radiation. An ultrasonic frequency band, for example and not by way of limitation, may be centered about 25 kHz.

Sound isolation provided by building materials is usually indicated by the material's Sound Transmission Class (STC). A material's STC is a whole number rating based on sixteen specific frequency measurements of audible sound attenuation in the range of 125 Hz to 4 kHz. For example, a typical indoor wall composed of half-inch drywall on each side with no insulation has an STC rating of 33. The STC rating of 33 denotes sound isolation conditions between normal speech taking place on one side of the wall being audible but not understandable on the other side of the wall, and loud speech occurring on one side of the wall being audible and understandable on the other side of the wall.

The STC rating connotes a qualitative characteristic. The STC scale provides an indication of the isolation people will experience from sounds that originate on the other side of physical barriers. The STC scale is useful in assessing cross-wall attenuation of near ultrasound frequencies. The exception is a region near the coincidence point. The coincidence point is the frequency at which sound is propagated through a material at the same velocity as through air. For a one inch thick gypsum board drywall, the coincidence point is about 1500 Hz. Frequencies around the coincidence point can constructively interfere, resulting in the generation of louder sounds. Measurements have shown that the attenuation of sound energy increases with increasing frequency and suggest an attenuation well in excess of 40 dB at 25 kHz for sound through the one inch of gypsum board drywall.

Glass can also provide good sound isolation. Glass becomes a more proficient acoustic reflector of sound at higher frequencies. The higher the acoustic frequency of the sound, the greater the attenuation will be for acoustic waves. Glass actually approaches perfection at being a reflector of sound at higher frequencies.

After all the lighting associates that successfully received a self-identification message have responded, the lighting associate that transmitted the self-identification message and the lighting associates that responded populate their direct connection tables recording the existence of viable communication paths between the lighting associate that transmitted the self-identification message and the lighting associates that responded.

The second phase of the networking and communications algorithm makes use of a lighting associate support network *. In one embodiment, this network provides for two-way power line communications between a Central Controller and each lighting associate.

The second phase of the networking and communications algorithm begins after the first phase is expected to be finished. This expectation is based on either (i) the lapse of a time interval between the initiation of the first phase of the networking and communications algorithm, the length of the time interval being selected based on the number of lighting associates involved in the first phase activity and the confidence desired that the first phase will have been completed in the selected time interval; the calculation of the duration of the time interval using techniques well known in the communication arts, or (ii) the cessation of transmissions by the lighting associates as reported by each of the lighting associates' acoustic power radiometer or radiometer to measure the amount of received acoustic power or electromagnetic signal power.

In the second phase of the commissioning process, the Central Controller polls each of the lighting associates, downloads the direct connection table from the polled lighting associates, and combines them to form a full direct connection table for the set of all the lighting associates. The full direct connection table is represented as a square matrix $$C=[c(i,j)]$$

where i and j are lighting associate identification numbers. By definition, $c(i, j)=1$ if there is a direct connection between nodes i and j or when $i=j$; $c(i, j)=0$ otherwise.

The full direct connection matrix is checked for reciprocity which is the condition where $$c(i,j)=c(j,i)$$

for every i and j. If the condition of reciprocity does not obtain, the Central Controller may announce the lack of condition of reciprocity to the HMI.

The Central Controller then proceeds to determine the number of lighting associate groups and the individual lighting associates that are included in each lighting associate group. To do this, the Central Controller, using the element reduction operation denoted by R where R operating on a matrix $N=[n(i,j)]$, $R(N)$ maps the matrix elements of N according to the rule $n(i, j) \leftarrow 1$ if $n(i, j) > 0$, and forms the following matrices:

$$M_1 = (C)$$
$$M_2 = R(C^2)$$
$$M_3 = R(C^3)$$
$$\vdots$$

until $M_{i+1}=M_i$. When this equality obtains, the number of distinct row patterns in $M_i$ is the number of lighting associate groups. The members of a lighting associate group are those lighting associates whose row patterns in $M_i$ are identical.

The Central Controller then transmits to each lighting associate the lighting associate identification numbers of the lighting associates in that lighting associate's group and also the full direct connection matrix for that lighting associate's group. The lighting associates may now function as receiving and transmitting messages related to various ordered tasks received from the lighting associate support network.

One example of the functioning of the networking and communications algorithm is illustrated in FIG. 5. The figure shows six lighting associates with identification numbers 201, 202, 203, 204, 205 and 206. The area in which the six lighting associates are located includes walls or partitions 510 and 520 that allow only line-of-sight communications between two lighting associates, for example, 201 and 202, 202 and 204, and 203 and 206.

The Central Controller receives the direct connection tables from all of the lighting associates and forms the full direct connection table as:

$$C = \begin{bmatrix} 1 & 1 & 0 & 0 & 0 & 0 \\ 1 & 1 & 0 & 1 & 0 & 0 \\ 0 & 0 & 1 & 0 & 0 & 1 \\ 0 & 1 & 0 & 1 & 0 & 0 \\ 0 & 0 & 0 & 0 & 1 & 0 \\ 0 & 0 & 1 & 0 & 0 & 1 \end{bmatrix}$$

which is interpreted as disclosing that lighting associate 201 has a direct connection to lighting associate 202, lighting associate 202 has a direct connection to both lighting associate 201 and lighting associate 204, lighting associate 203 has a direct connection to lighting associate 206, lighting associate 204 has a direct connection to lighting associate 202, lighting associate 205 has no direct connection to a lighting associate, and lighting associate 206 has a direct connection to lighting associate 203.

Figure 6:
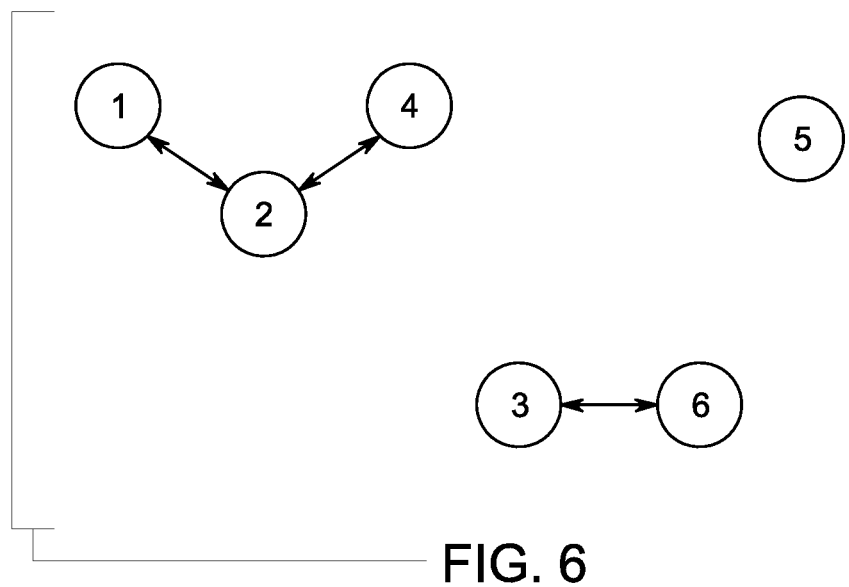
FIG. 6 illustrates lighting associate direct connections.

The full direct connection matrix of the example exhibits reciprocity and the full direct connection table discloses the lighting associate direct connections illustrated in FIG. 6. FIG. 6 shows that there are three lighting associate groups. One group consists of the three lighting associates 1, 2, and 4; a second group consisting of two lighting associates 3 and 6; a third group consisting only of lighting associate 5.

The Central Controller now forms a series of matrices $M_1$, $M_2$, until $M_{i+1}=M_i$.

$$M_1 = \begin{bmatrix} 1 & 1 & 0 & 0 & 0 & 0 \\ 1 & 1 & 0 & 1 & 0 & 0 \\ 0 & 0 & 1 & 0 & 0 & 1 \\ 0 & 1 & 0 & 1 & 0 & 0 \\ 0 & 0 & 0 & 0 & 1 & 0 \\ 0 & 0 & 1 & 0 & 0 & 1 \end{bmatrix}$$

$$M_2 = \begin{bmatrix} 1 & 1 & 0 & 1 & 0 & 0 \\ 1 & 1 & 0 & 1 & 0 & 0 \\ 0 & 0 & 1 & 0 & 0 & 1 \\ 1 & 1 & 0 & 1 & 0 & 0 \\ 0 & 0 & 0 & 0 & 1 & 0 \\ 0 & 0 & 1 & 0 & 0 & 1 \end{bmatrix}$$

$$M_3 = \begin{bmatrix} 1 & 1 & 0 & 1 & 0 & 0 \\ 1 & 1 & 0 & 1 & 0 & 0 \\ 0 & 0 & 1 & 0 & 0 & 1 \\ 1 & 1 & 0 & 1 & 0 & 0 \\ 0 & 0 & 0 & 0 & 1 & 0 \\ 0 & 0 & 1 & 0 & 0 & 1 \end{bmatrix}$$

$M_3=M_2$ and $M_2$ discloses that there are three row patterns that are distinct, i.e., 110100, 001001, and 000010. This reveals that there are three lighting associate groups. The members of a lighting associate group are those lighting associates whose row patterns in $M_2$ are identical. This reveals that the three lighting associate groups consist of lighting associates 1, 2, and 4; lighting associates 3 and 6; and lighting associate 5, a solo member lighting associate group. The Central Controller transmits to each lighting associate the lighting associate identification numbers of the lighting associates in that lighting associate's group and also the full direct connection matrix for that lighting associate's group.

In each lighting associate group, one lighting associate in the group is designated by the Central Controller as the master of the group. As an example, the master of the group might be identified as the lighting associate in the group having the lowest identification number.

Messages to the group from the Central Controller may be received by the master of the group using the lighting associate support network. Also, all messages to the Central Controller from the group may be sent by the master of the group using the lighting associate support network.

The first phase of the networking and communications algorithm makes use of the messages illustrated in FIGS. 3 and 4. These messages are relatively short and never exceed the length of the sum of the number of symbols in the SYNC word, the TYPE field, the Identification number of the lighting associate that transmitted its self-identification message and the identification number of the answering lighting associate. This length is fixed and therefore the length of the longest message transmitted in the first phase of the networking and communications algorithm is fixed. For relatively short messages of fixed length, collision detection multiple access is a preferred embodiment. For the second phase of the networking and communications algorithm, the messages may be much longer than the longest message transmitted in the first phase of the networking and communications algorithm and the messages may be of varying length. Another fundamental difference between the messaging in phases one and two is that the phase two messaging is predictable as opposed to the messaging in the first phase which is messaging originated to discover communications structure. In the second phase, the communications structure has been established and is known to all of the lighting associates. Therefore, the time that will be consumed by a message relayed through a lighting associate group is generally predictable and the messaging protocol may be guided by a time-division multiple access approach. For example, if a message is received by the master lighting associate of a particular group, that message will be relayed to all members of that group. The different members know the direct connections between the lighting associates composing the group and the rules that pertain to relaying that message to those group members.

In another embodiment, data may be sent to or received from a lighting associate group using a data messaging service such as the Internet or a wireless communication service such as a cell phone network.

Figures 7, 8:
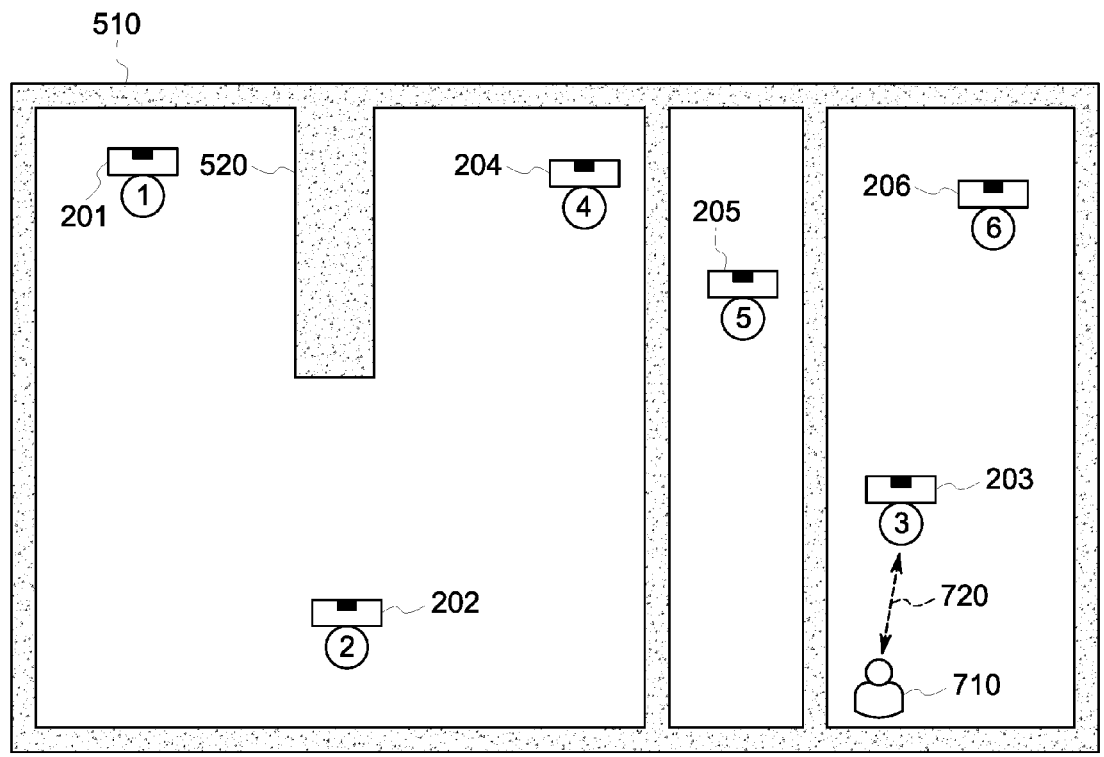
FIG. 7 illustrates a Point of Presence.
FIG. 8 illustrates a variable length data message format.

As illustrated in FIG. 7, in an example of this embodiment, a mobile or fixed transceiver 710 serves as a Point of Presence (PoP) between the master lighting associate, lighting associate 203, of the group consisting of lighting associates 203 and 206. The communications 720 between the master lighting associate 203 and the mobile or fixed transceiver 710 may be the same wireless mode as the communications between lighting associates.

A message format that may be used to receive or send data using the data messaging service associated with the point of presence is illustrated in FIG. 8. This message format is used for sending instructions, such as functions to be performed, and for sending data such as camera frame pixels. The data may even include reprogramming of a particular microcontroller and for data like this, that must be strongly protected against errors, the TYPE field may inform the receivers that an error detection field, such as a CRC, will be the trailing field of the message.

Error correction techniques may be employed for messages sent between lighting associates. Embodiments are envisioned wherein error rates are identified, controlled and corrected using known error correction techniques. Embodiments are envisioned that correct any and all errors that occur using error correction techniques. Other embodiments are envisioned wherein errors can be no greater than a predetermined amount or a predetermined type of error. Errors may occur that are correctable or non-correctable. The system may be pre-programmed regarding actions to be taken if a predetermined type of error occurs of if a predetermined number of errors are met or exceeded. One of these steps may be to give an indication to resend the message or that the message was not received correctly.

In the process of identifying its fellow group members, a lighting associate may determine that errors have resulted. Communication errors can occur for numerous reasons. In an embodiment, lighting associates will attempt to identify a reliable communications path between potential members of a group. In making the determination of which paths provide reliable communications, the attempted paths may pass through non-load-bearing work area separators, such as path 180, or through load bearing work area separators, such as path 170. The likelihood of errors occurring depends upon the type of transmission being attempted (for example either acoustic or electromagnetic radiation), the processing of the received signal, and/or the composition of the work area separator. Errors can occur as a result of these various factors individually or in combination. If errors occur they may be correctable through error correction techniques or the lighting associates may be able to identify an alternative path through which messages can be relayed reliably using a different set of lighting associates within the group.

If errors occur that are non-correctable, then the system may remove or not allow group membership to one or more of the lighting associates that can not reliably communicate. In an embodiment, a predetermined number or type of non-correctable errors may be allowed.

A particular lighting associate may be directed to determine if there is motion in an area under surveillance by using a camera resident on the particular lighting associate. The detection of motion makes use of the particular lighting associate's microcontroller and is accomplished by the microcontroller's program causing a camera to record two pictures of N pixels each at two distinct times, t and t+τ, where τ>0, resulting in recorded digital pixel values of the two pictures. The recorded digital pixel values of the two pictures are, respectively, and $\{p_t(i,j)\}$ and $\{p_{t+\tau}(i,j)\}$. The microcontroller normalizes the recorded digital pixel values of the two pictures by performing the operations $$\{p_t(i, j)\} \leftarrow \{p_t(i, j)\} - \frac{1}{N} \sum_i \sum_j p_t(i, j) \text{ and}$$

$$\{p_{t+\tau}(i, j)\} \leftarrow \{p_{t+\tau}(i, j)\} - \frac{1}{N} \sum_i \sum_j p_{t+\tau}(i, j).$$

The microcontroller forms a difference, d, according to $$d = \sum_i \sum_j |P_{t+\tau}(i, j) - p_t(i, j)|.$$

The microcontroller then executes programmed techniques of signal detection that are well known in the art. Typically this is done by using a Receiver Operating Characteristic (ROC) curve with a threshold mediating between the customer's tolerance for false alarms and desire for high probability of detection to decide whether or not there has been motion detected in the interval [t,t+τ].

In some cases, there may be vibration present in the structure supporting the particular lighting associate and the vibration may cause the camera to image a slightly different area during the vibration. This could lead to a false declaration of motion due to the vibration alone. It may therefore be desirable to incorporate a means to reduce the false alarms insinuated by the vibration. To do this, the particular lighting associate may be equipped with a resident accelerometer and the particular lighting associate's microcontroller programmed to monitor the accelerometer's voltage output $a(\xi)$ over the interval $[t,t+\tau]$ and to form the energy integral, A, as $A=\int_t^{t+\tau} a^2(\xi)d\xi$. The microcontroller then executes programmed techniques of signal detection that are well known in the art. Typically this is done by using an ROC curve with a threshold mediating between the customer's tolerance for false alarms and desire for high probability of detection to decide whether or not there has been motion detected in the interval $[t,t+\tau]$.

The lighting associates may be used to report their location as determined by an onboard GPS device or indoor location system. Approaches to determine location may also be through ultrasound, RF Received Signal Strength Indication (RSSI), or phased array ranging and direction finding.

Individual lighting associates may also be commanded to repeatedly flash their lamp or repeatedly sound an annunciator in order to help an operator determine their location in a walk around.

A lighting associate group containing a plurality of lighting associates, whose wireless communications are acoustic, may have two or more of its members designated to estimate environmental conditions such as temperature and humidity. The designated lighting associates may be operated to emit, receive, and process specially constructed acoustic signals having specific signatures. A first member of the designated lighting associates may transmit a specifically constructed acoustic pair of signals that can be detected by another member of the designated lighting associates. In one embodiment, the specifically constructed acoustic signatures may have different ultrasonic center frequencies. In another embodiment, the lighting associates may use an accurate time reference to measure the speed of acoustic transmissions at the different ultrasonic center frequencies.

Relevant data for designing an estimator of the environmental conditions of temperature and humidity may be found in articles by Donald P. Massa entitled "Choosing an Ultrasonic Sensor for Proximity or Distance Measurement Part 1: Acoustic Considerations," and "Choosing an Ultrasonic Sensor for Proximity or Distance Measurement Part 2: Optimizing Sensor Selection," found at http://www.massa.com/wp-content/uploads/Sensors_February-March_1999.pdf.

It is important to detect failure of the lamp but an LED may not admit of purely electronic detection as a failing LED simply becomes ever dimmer while still drawing the same operational current. Detection of a failing lighting associate's LED lamp may be done in a variety of ways. In one embodiment, a first lighting associate fitted with a resident camera can use its suitably programmed microcontroller to detect a change in the illumination provided by the first lighting associate when the first lighting associate's lamp is commanded to change illumination state; i.e., from OFF to ON or ON to OFF. Detection of a change in the illumination provided by the first lighting associate is evidence that the first lighting associate's lamp is still functioning although it may have undergone dimming due to inchoate failure.

In another embodiment, a second lighting associate fitted with a camera, and having an unobstructed optical view of the first lighting associate, can use its suitably programmed microcontroller to calculate the change in illumination from the first lighting associate when the first lighting associate has been commanded to repeatedly flash its lamp. A detected change of illumination can be used to verify the functioning of the first lighting associate's lamp and measurement of the amount of luminescent flux change may be used to estimate the health of the first lighting associate's lamp.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A lighting fixture comprising:
   a first transmitter for transmitting a first message to a second lighting associate;
   a first receiver for receiving a second message from the second lighting associate;
   a second transmitter for transmitting a third message via a lighting associate support network;
   a second receiver for receiving a fourth message via the lighting associate support network;
   an interval timer;
   a microcontroller in communication with the interval timer, programmable to execute a networking and communication algorithm to process the first, second, third, and fourth messages such that no message is transmitted if a communication channel is in use and further wherein a beginning of transmission of a message over a quiet channel is delayed by a random time interval to mitigate message collisions;
   an LED lamp; and
   a switch between the lamp and a power line, controllable by the microcontroller.

2. The lighting fixture of claim 1 wherein the lighting associate support network is the power line, and each of the second transmitter and the second receiver uses a power line coupler to the power line.

3. The lighting fixture of claim 2 wherein the lighting fixture support network is connected to a Central Controller comprising a computer programmable to execute the networking and communication algorithm.

4. The lighting fixture of claim 3 wherein the Central Controller is connected to a human-machine-interface (HMI) comprising;
   controls operable by a human operator; and
   output devices suitable for informing or alerting the human operator to conditions requiring the human operator's attention.

5. The lighting fixture of claim 1 further comprising a camera operatively coupled to the microcontroller, the microcontroller programmable to detect motion.

6. The lighting fixture of claim 5 further comprising an accelerometer operatively coupled to the microcontroller.

7. The lighting fixture of claim 1 further comprising an acoustic annunciator coupled to the microcontroller programmable to repeatedly actuate the acoustic annunciator.

8. A lighting system comprising a plurality of lighting associates connected via a power line, each lighting associate of the plurality of lighting associates comprising
   a first transmitter for transmitting a first message to a second lighting associate;
   a first receiver for receiving a second message from the second lighting associate;
   a second transmitter for transmitting a third message via a lighting associate support network;
   a second receiver for receiving a fourth message via the lighting associate support network;

an interval timer;

a microcontroller in communication with the interval timer, programmable to execute a networking and communication algorithm to process the first, second, third, and fourth messages such that no message is transmitted if a communication channel is in use and further wherein a beginning of transmission of a message over a quiet channel is delayed by a random time interval to mitigate message collisions;

an LED lamp; and a switch between the lamp and a power line, controllable by the microcontroller.

9. The lighting system of claim 8, wherein the lighting associate support network is the power line, and each of the second transmitter and the second receiver is a power line coupler to the power line.

10. The lighting system of claim 8, further comprising a camera operatively coupled to the microcontroller, the microcontroller programmable to detect motion.

11. The lighting system of claim 10, further comprising an accelerometer operatively coupled to the microcontroller.

12. The lighting system of claim 10, further comprising an acoustic annunciator coupled to the microcontroller programmable to repeatedly actuate the acoustic annunciator.

13. The lighting system of claim 8, wherein the lighting associate support network is connected to a Central Controller comprising a computer programmable to execute the networking and communication algorithm.

14. The lighting system of claim 13, wherein the Central Controller is connected to a human-machine-interface (HMI) comprising;

controls operable by a human operator; and output devices suitable for informing or alerting the human operator to conditions requiring the human operator's attention.

* * * * *